United States Patent [19]

Koshizawa

[11] Patent Number: 5,177,606
[45] Date of Patent: Jan. 5, 1993

[54] IMAGE DETECTION SYSTEM FOR A CAR WITH ADJUSTMENT FOR WIPER IMAGE

[75] Inventor: Toshifumi Koshizawa, Ebina, Japan

[73] Assignee: Isuzu Motors Limited, Tokyo, Japan

[21] Appl. No.: 766,068

[22] Filed: Sep. 27, 1991

[30] Foreign Application Priority Data

Sep. 28, 1990 [JP] Japan .................................. 2-262661
Sep. 28, 1990 [JP] Japan .................................. 2-262662
Sep. 28, 1990 [JP] Japan .................................. 2-262663

[51] Int. Cl.$^5$ .............................................. H04N 7/18
[52] U.S. Cl. ....................................... 358/103; 358/93
[58] Field of Search ................... 358/103, 108, 229, 93

[56] References Cited

U.S. PATENT DOCUMENTS 5,111,289  5/1992  Lucas et al. ........................ 358/103

Primary Examiner—Victor R. Kostak
Attorney, Agent, or Firm—Staas & Halsey

[57] ABSTRACT

An image detection system for a car arranged such that only when the drive angle of a wiper of the car resides within a predetermined image pickup angle range or a predetermined image pickup angle range corrected according to the pan angle of a TV camera unit, a change-over switch is controlled to change over to the side of an image storage from which static image data are provided as outputs. Alternatively, it can be arranged such that a masking range the wiper crosses in all of the scanning lines, of an image in front of the wiper, perpendicular to the moving direction of the wiper is determined from a drive angle of the wiper and only the image of the scanning lines for the wiper is masked and substituted by blank data or static update data.

10 Claims, 11 Drawing Sheets $\beta_0 \sim \beta_3$ : WIPER OPERATING ANGLE RANGE
$\beta_1 \sim \beta_2$ : ANGLE RANGE INCLUDING A WIPER

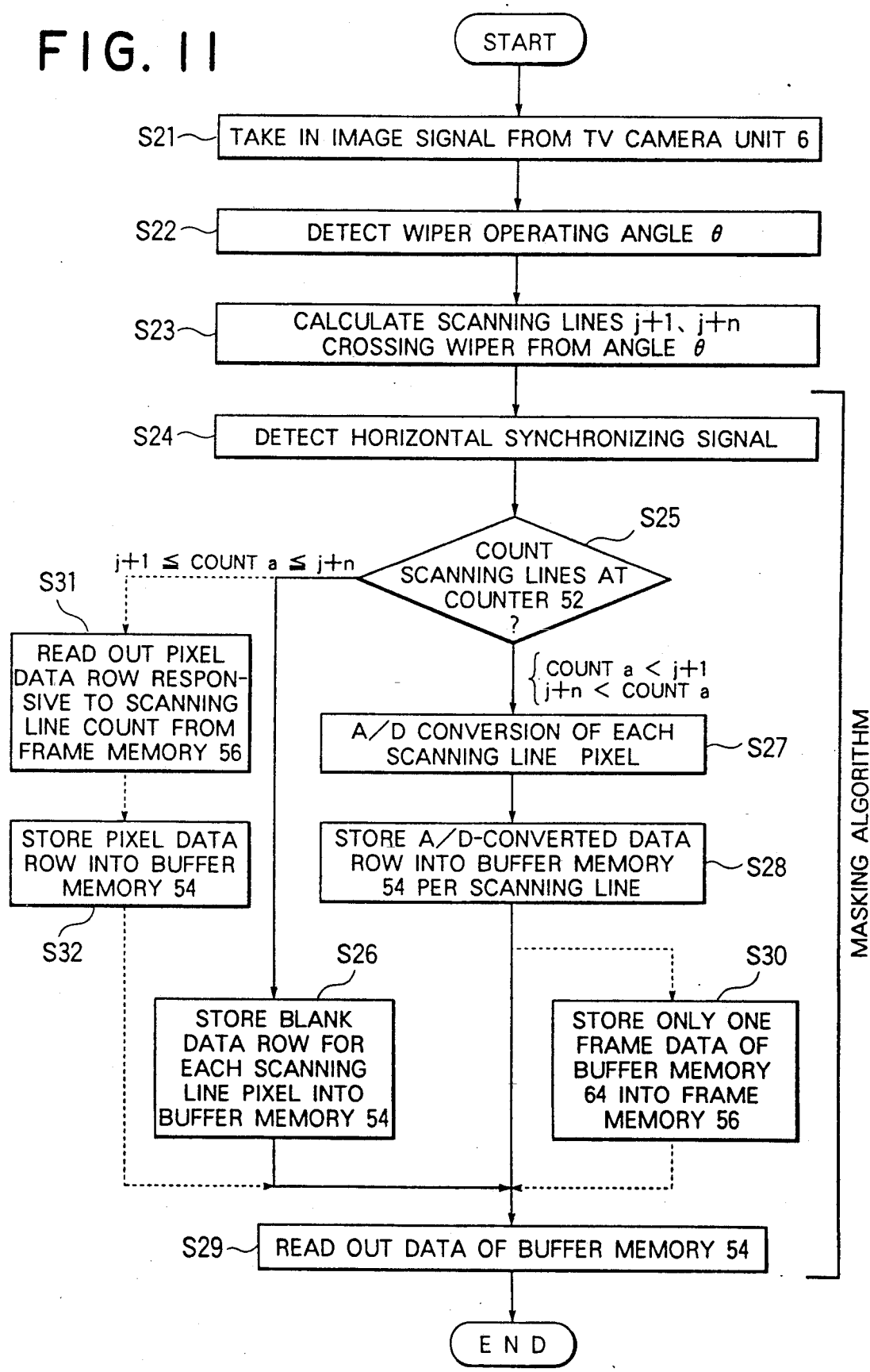

IMAGE DETECTION SYSTEM FOR A CAR WITH ADJUSTMENT FOR WIPER IMAGE

BACKGROUND OF THE INVENTION

The present invention relates to an image detection system for a car, and in particular to a system for detecting and processing an image of a TV camera mounted on a car.

Heretofore, a system has been researched and developed in which a TV camera is mounted on a car as image detection means in order to find out obstacles on the road forward or backward of the car wherein an alarm is given to a driver, or a brake or a steering gear is automatically operated.

In this system, the TV camera can be mounted outside a car on one hand or inside a car on the other hand. In the former case, it is disadvantageous in that raindrops in case of rain etc. or dust adhere to the surface of the lens of the TV camera, thereby disturbing a clear image.

A system for removing raindrops or dust which thus adheres to the surface of the lens of the TV camera is disclosed in Japanese Utility Model Application Laid-open No. 59-25528. However, this system is disadvantageous in that the lens of the TV camera should be rotated every time one desires to clean up raindrops or dust on the lens, which consumes time and disables an image taken meanwhile to be used.

Moreover, in the latter case where the TV camera is mounted outside a car, the TV camera per se is exposed to raindrops or dust so that the function thereof is easily deteriorated, resulting in a short life.

Therefore, the TV camera mounted inside a car is preferably to the one mounted outside a car.

However, it is also disadvantageous in that the image of a wiper for removing raindrops or dust intrudes into images detected by the TV camera. Therefore, if image processing is carried out as it is, a screen including the wiper image has no context with the adjacent screens so that the wiper image is to be detected as the nearest obstacle.

Thus, useless image processing with such an unavailable image, is carried out so as to cause the car erroneously to run in an automatic chase for an object.

SUMMARY OF THE INVENTION

Accordingly, it is an object of the present invention to provide an image detection system for a car, with a TV camera mounted inside a car, which always makes clear images available with no influence of a wiper image.

According to the present invention, image detecting means continuously detects an image in front of a wiper and provides it for image storing-updating means and a change-over means in the form of data.

While the wiper is driven by driving means, when the drive angle of the driving means is detected by drive angle detecting means and provided for controlling means, the controlling means determines whether or not the detected drive angle of the wiper resides within a predetermined image pickup angle of the image detecting means and controls the change-over means to the side of the image storing-updating means. At the same time, the controlling means makes the storing-updating means provide the image as data output.

Thus, as shown in FIG. 2, when the wiper resides outside the predetermined image pickup angle $\beta_1 \sim \beta_2$, the dynamic image A detected by the image detecting means is directly provided as an output without change while when the wiper resides within the predetermined image pickup angle $\beta_1 \sim \beta_2$, the dynamic image is unavailable so that an update image A' having been updated and stored in the image storing-updating means from the image detecting means so far is provided as an static image output.

Accordingly, a clear image is detected with no influence of the wiper image even in rainy weather etc. and useless processing time can be removed in image processing and recognition etc. which are carried out for the provided image data.

According to another aspect of the present invention normally, for the purpose of more accurate recognition (object chase) of visual information around the car with reference to the region of the detected image A as shown in FIG. 2, the image detecting means is panned in the up, down, right and left directions within a certain fixed range by panning means to obtain a desired image.

Since the image detecting means is thus panned up, down, right and left by the panning means, the detected dynamic image A in FIG. 2 is relatively moved according to the panning of the image detecting means even though the moving range of the wiper is fixed.

Therefore, if the panning range of the detected dynamic image A is such as shown by dotted lines in FIG. 5, and in a case where the detected dynamic image A is panned up, down, right and left by the panning means to e.g. the moved lower left position shown by oblique line in FIG. 6, it is found necessary that the wiper angle $\beta_2 - \beta_1$ of invalid image before panning is corrected for the processing to an angle $\gamma_1 + \gamma_2$.

Thereupon, the controlling means takes into account not only the drive angle of the driving means but also the pan angle from the panning means in which comparison and determination are made between the predetermined image pickup angle range corrected from the above noted predetermined image pickup angle range $\beta_1 \sim \beta_2$ according to the pan angle and the drive angle of the driving means, thereby changing the dynamic image over to the dynamic image A'.

Thus, even if the image detecting means is panned up, down, left and right anyhow, a clear image is obtained with no influence of the wiper image and whatever panning position the image detecting means is controlled to chase an object.

According to a further aspect of the present invention, the scanning lines of an image detected by the image detecting means is preset in the direction substantially perpendicular to the moving (cleaning) direction of the wiper as shown in FIG. 9.

Hereupon, since the wiper has a certain width as shown by oblique lines in FIG. 9, image processing means which has taken in the detected image form the image detection means determines the scanning lies in the masking range for the wiper on the basis of the drive angle of the driving means, in a range which crosses the detected image of the wiper in scanning lines forming the detected image.

Then, the image processing means masks only the scanning lines in the masking range and provides them as blank data output and provides as an output the detected image with respect to other scanning lines as it is.

Hereby, when the wiper image intrudes into the image processing means in the form of the detected image, the portion of the scanning lines not crossing the image of the wiper is provided as an output while only the portion of the scanning lines crossing the same is masked and then provided as an output.

Also, according to the present invention, the image processing means, instead of the above masking operation, may substitute update static detected image in a valid portion of scanning lines not including the wiper image for the image of the scanning lines the range to be masked. Therefore, only the image of the scanning lines in the masked range is transplanted with static image data for the corresponding scanning lines among an update detected image not including the wiper image.

Thus, the deterioration of the quality of the image data due to the wiper image in rainy weather etc. is kept to an extremely limited, minimum area in which the wiper can exist on the detected image.

BRIEF DESCRIPTION OF THE DRAWINGS

The present invention will now be more apparent to those skilled in the art from the attached drawings in which.

DETAILED DESCRIPTION OF THE PREFERRED EMBODIMENTS

Figure 1:
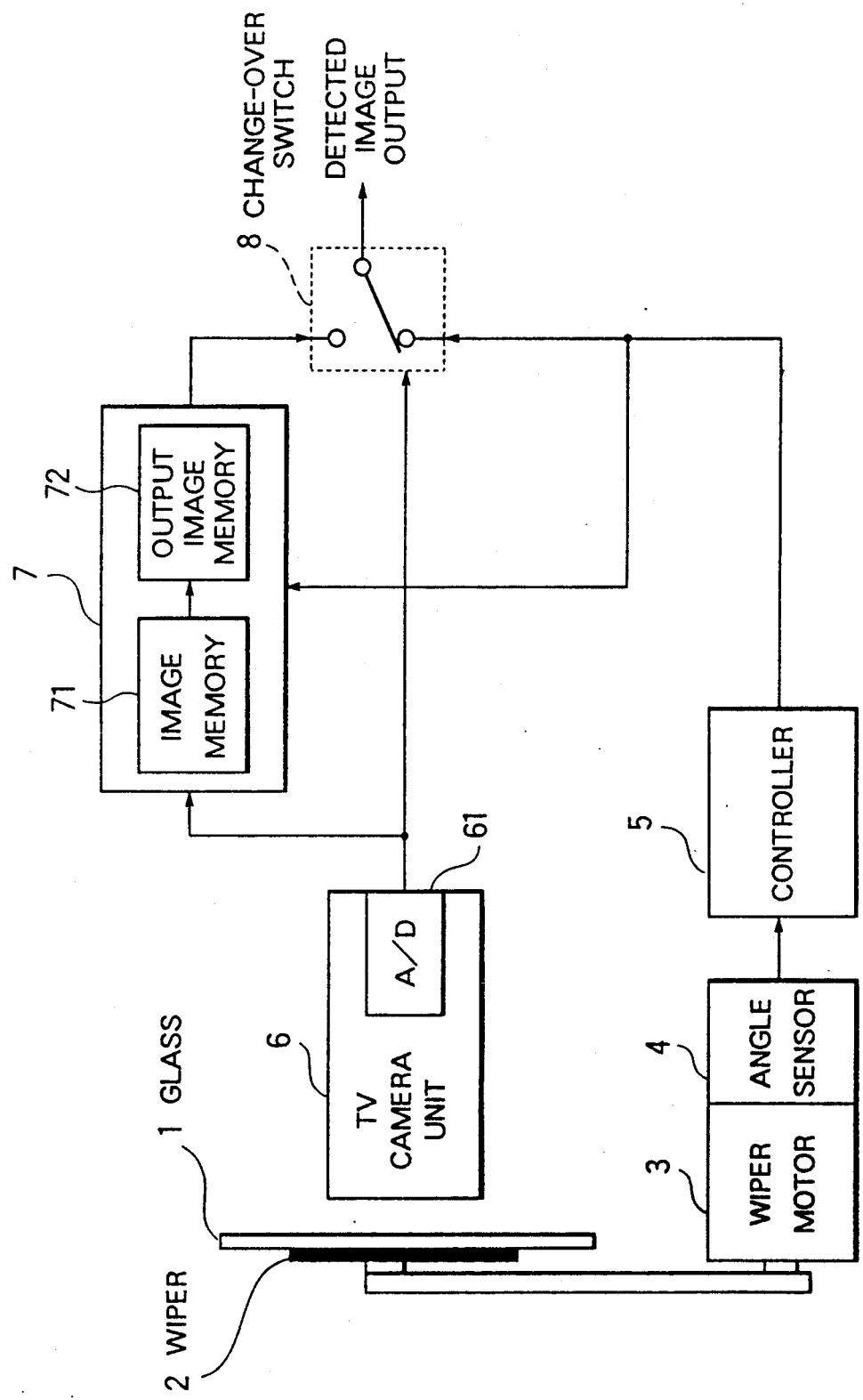
FIG. 1 is a block diagram showing a system arrangement of one embodiment of an image detection system for a car according to the present invention.

FIG. 1 is a block diagram illustrating the arrangement of one embodiment of a distance measuring equipment according to the present invention, in which a non-reflecting protective glass 1 forms a front window (or a rear window under some circumstances) of a car (not shown), a wiper 2 is provided outside the protective glass 1 to clean up raindrops or dust which adheres to the protective glass 1, a wiper motor 3 is connected to the wiper 2 and serves as means for driving the wiper 2, and an angle sensor 4 is provided for detecting a drive angle of the wiper motor 3.

A controller 5 is connected to the angle sensor 4 and serves as change-over controlling means to generate a control signal on the basis of the output signal of the angle sensor 4. A TV camera unit 6 is provided to detect an image in front of the wiper 2 and includes an A/D (Analog/Digital) converter which converts the detected image into digital data. An image storage 7 which includes an image memory 71 and an output image memory 72 is connected to the TV camera unit 6 and serves as means for updating and storing (hereinafter abbreviated as storing-updating) the output data of the TV camera unit 6. A change-over switch 8 is connected to the TV camera unit 6 and the image storage 7, and changes the image storage 7 over to the TV camera unit 6. The image storage 7 and the change-over switch 8 are under control of the controller 5.

Figure 2:
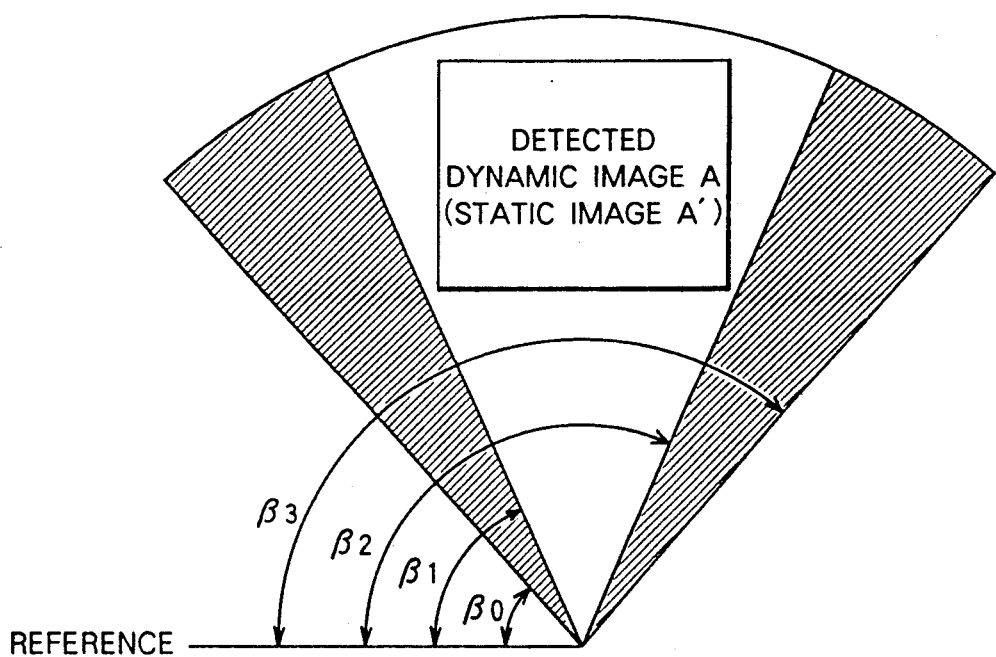
FIG. 2 is a principle graph for illustration of the relationship between an operating angle of a wiper and a detected image in the present invention.
Figure 3:
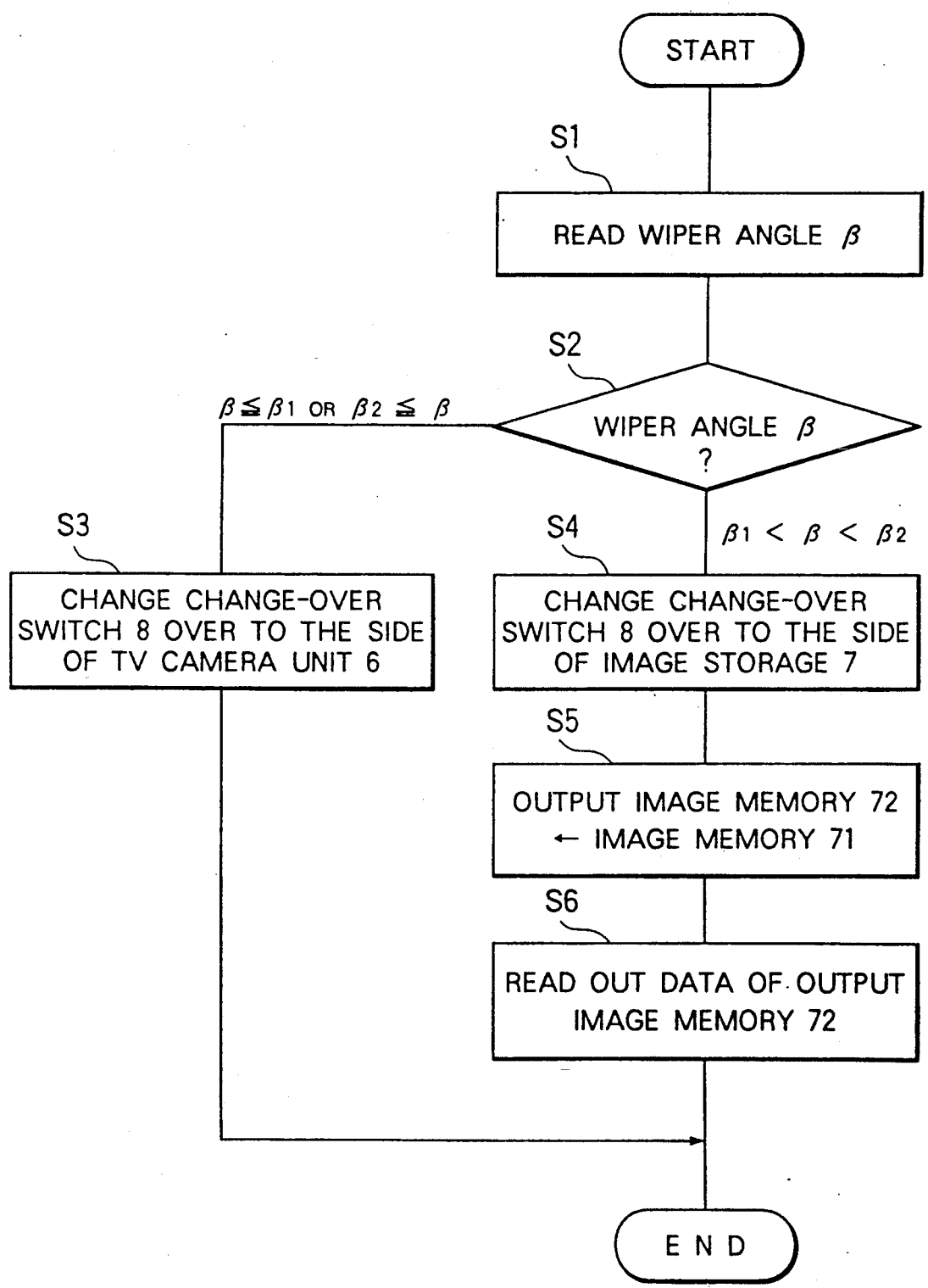
FIG. 3 is a flow chart showing the processing algorithm of a controller used in FIG. 1.

Next, the operation of the above embodiment will be described with reference to FIG. 2 and FIG. 3 showing the processing algorithm of the controller 5.

The TV camera unit 6 detect an image A (FIG. 2) in front of the wiper 2, converts it into digital data at the A/D converter 61 included therein, and continuously delivers the data to the image memory 71 of the image storage 7 as well as the change-over switch 8. At this time, storing the image data from the TV camera unit 6, the image memory 71 is updated by the latest image data.

In this state, the data of the image memory 71 has not yet been transferred to the output image memory 72.

In the meantime, the wiper 2 is being driven by the wiper motor 3 the drive angle $\beta$ of which is detected by the angle sensor 4 and is read to the controller 5, as shown at Step S1 in FIG. 3.

The controller 5 then determines whether or not the drive angle $\beta$ resides within a predetermined image pickup angle range $\beta_1 \sim \beta_2$ shown in FIG. 2 of the TV camera unit 6, as shown at Step S2.

As a result of this determination, if it is found that the drive angle $\beta$ of the wiper 2 resides in the angle range ($\beta_0 < \beta \leq \beta_1$ or $\beta_2 < \beta \leq \beta_3$) shown by oblique lines in FIG. 2, which means that the detected image A is not disturbed by the wiper 2, the controller 5 makes the change-over switch 8 change over to the side of the TV camera unit 6 to provide as an output the detected image data, as shown at Step S3.

If it is found that the drive angle $\beta$ of the wiper 2 resides in the angle range ($\beta_1 < \beta < \beta_2$) other than the oblique line portion in FIG. 2, the detected image A is disturbed by the wiper 2 so that it can not be used as it is. It should be noted that the angle range $\beta_1 \sim \beta_2$ can be preset in the controller 5 so as to correspond with the detected image A as a reference.

Therefore, the controller 5 makes the change-over switch 8 change over to the side of the image storage 7, as shown at Step S4.

Then the controller 5 makes the update image data which is always updated and stored at the image memory 71 of the image storage 7 transfer to the output image memory 72 as shown at Step S5, and makes the data of the output image memory 72 provide as an output through the change-over switch 8 as shown at Step S6.

Thus, when the wiper 2 resides outside the angle range $\beta_1 \sim \beta_2$, the detected image A from the TV camera unit 6 is directly provided as dynamic image data output without change, and when the wiper 2 resides inside the pickup angle range $\beta_1 \sim \beta_2$, the update image A' which has been stored while updated at the image memory 71 is sequentially transferred as a static image to the output image memory 72 for a time interval the wiper 2 takes to pass through the angle range $\beta_1 \sim \beta_2$. Then, the static image data of the output image memory 72 is read out and provided as an output through the change-over switch 8.

Figure 4:
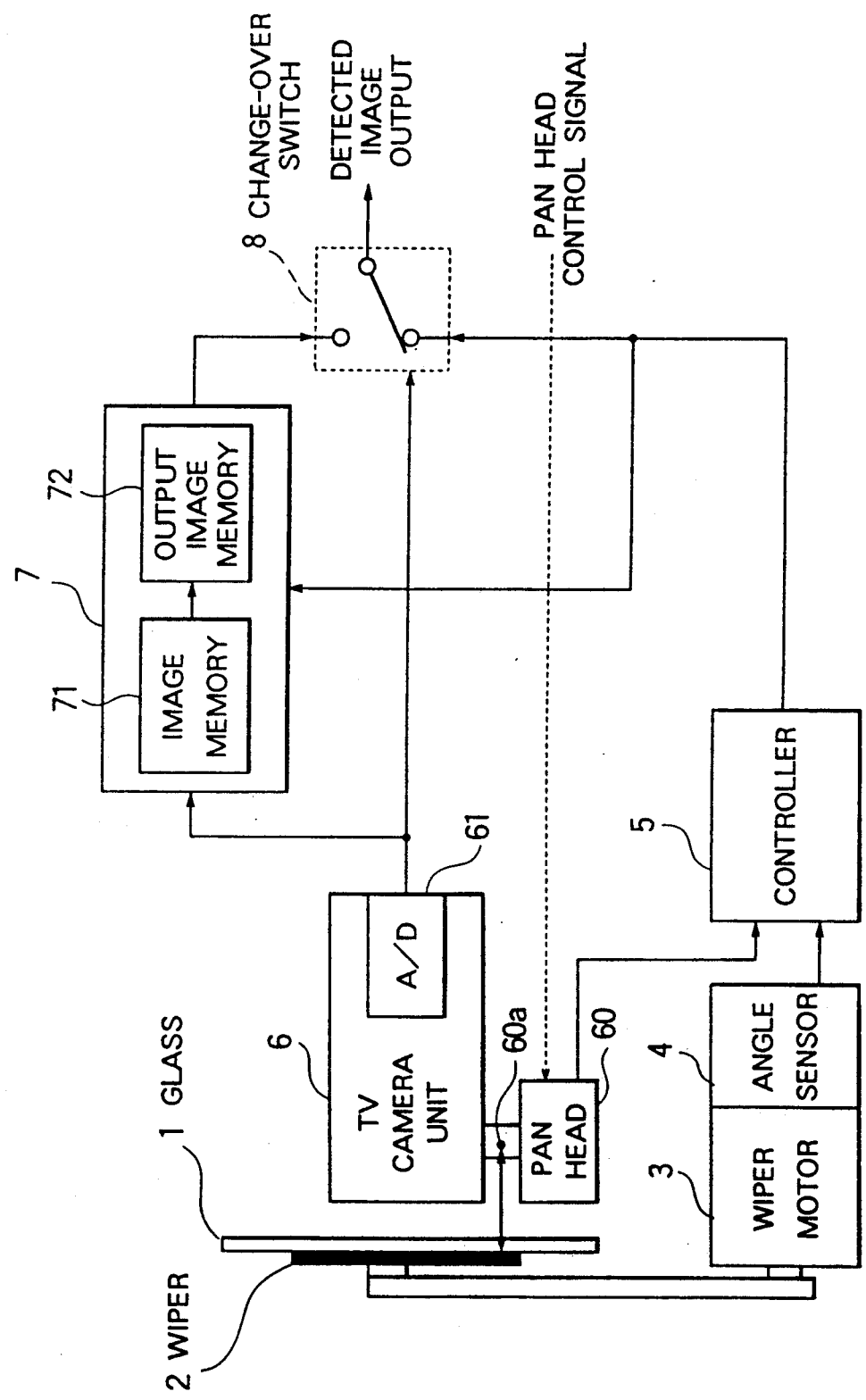
FIG. 4 is a block diagram of a system arrangement of another embodiment of an image detection system for a car according to the present invention.

FIG. 4 is a block diagram illustrating the arrangement of another embodiment of an image detection system according to the present invention for the purpose of chasing an object in front of the car by using an image taken by the TV camera unit 6.

For this purpose, the TV camera unit 6 is mounted on a pan head 60 which serves as panning means for panning the TV camera unit 6 in the up/down and right-/left directions and provides as an output an angle signal in the respective directions at the time of panning. So, the controller 5 serving as change-over controlling means generates a control signal for the image storage 7 and the change-over switch 8 by comparing a predetermined image pickup angle range as shown in FIG. 2 of the TV camera unit 6 corrected with the pan angle provided from the pan head 60 with the angle of the wiper 2 detected by the angle sensor 4. It is to be noted that a control signal shown by dotted line in FIG. 4 is provided for the pan head 60 when a control unit (not shown) finds it necessary to pan the TV camera unit 6 as a result of processing image data from the change-over switch 8, and that other elements correspond wit the elements shown by the same reference numerals in FIG. 1.

Next, the operation of the above embodiment in FIG. 4 will be described with reference to FIG. 2 and FIGS. 5 to 7.

Figure 5:
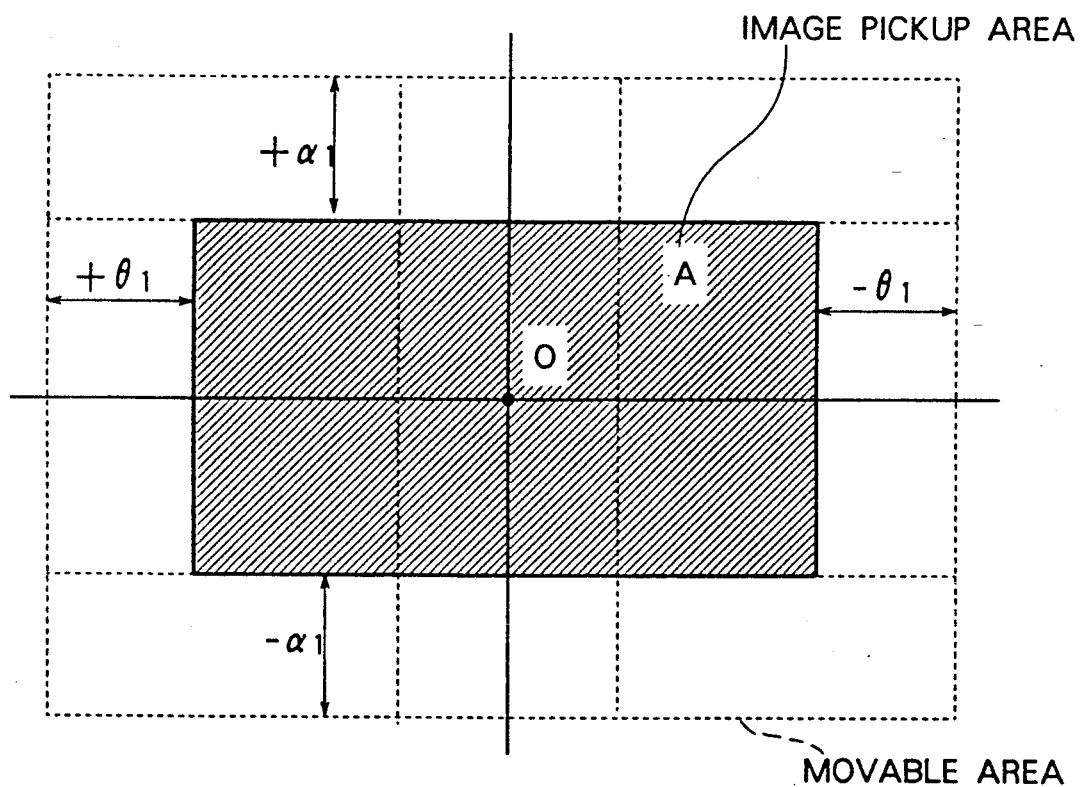
FIG. 5 is a graph for the illustration of a movable area of an image pickup area of a TV camera unit at the time of panning in the embodiment in FIG. 4.

It is now assumed that the TV camera unit 6 supported by the pan head 60 can pan to the maximum angle $\pm \alpha_1$ in the up/down pickup directions and the maximum angle $\pm \theta_1$ in the right/left pickup directions with reference to the origin 0 as shown in FIG. 5. Namely, a pickup image A, shown by oblique lines, corresponding to the detected dynamic image A in FIG. 2 can move within an area shown by dotted lines.

At this time, the pan head 60 always provides as an output for the controller 5, by means of a potentiometer or a rotary encoder included therein, the angles of $\alpha$ ($\alpha \leq \alpha_1$) and $\theta$ ($\theta \leq \theta_1$) respectively in the up/down and right/left directions at the time of panning. It is to be noted that such an angle detection may be carried out by various known techniques.

The TV camera unit 6 on the pan head 60 takes an image A (see FIG. 2) in front of the wiper 2, converts it into digital data at the A/D converter 61, and continuously delivers the data to the image memory 71 of the image storage 7 and the change-over switch 8.

At this time, storing the image data from the TV camera unit 6, the image storage 71 is continuously updated by the latest image data. In this state, the data of the image memory 71 has not yet been transferred to the output image memory 72.

Figure 7:
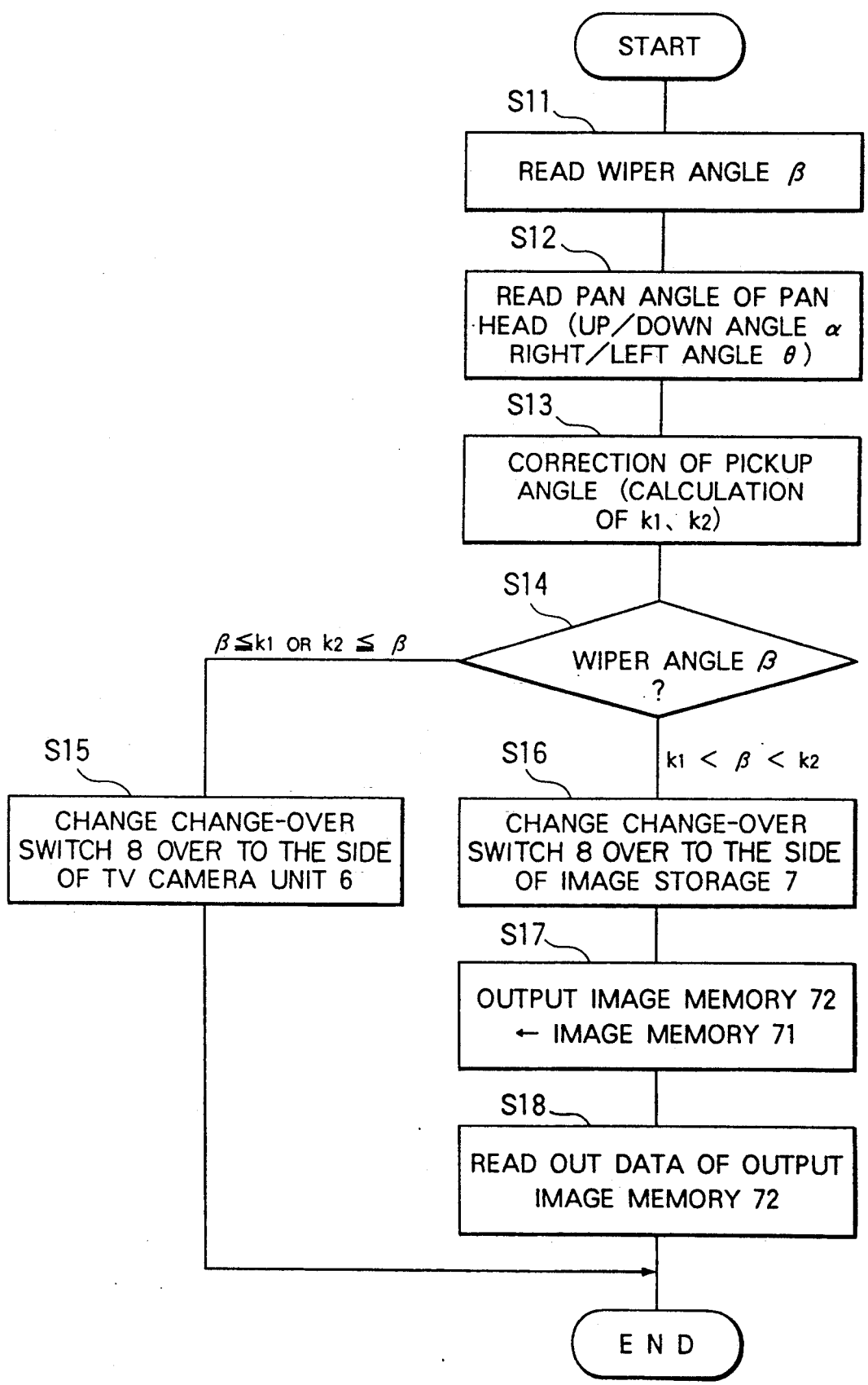
FIG. 7 is a flow chart showing the processing algorithm of a controller used in the embodiment in FIG. 4.

In the meantime, the wiper 2 is being driven by the wiper motor 3 the drive angle $\beta$ of which is detected by the angle sensor 4 and is provided for the controller 5, shown at Step S11 in the flow chart of the controller 5 in FIG. 7.

Also, the controller 5 is provided with an up/down angle $\alpha$ and a right/left angle $\theta$ which are the pan angles of the TV camera unit 6, as shown at Step S12

Figure 6:
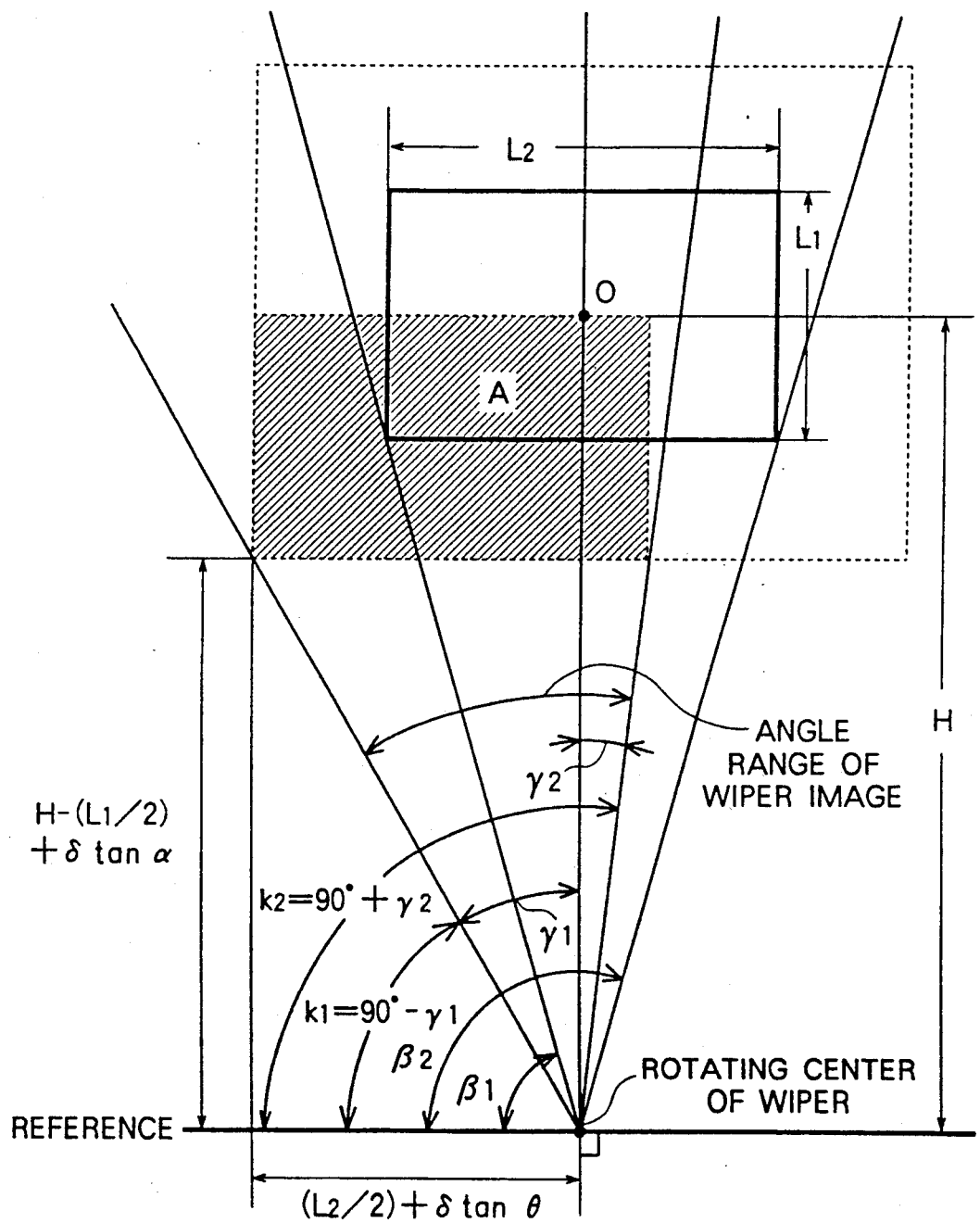
FIG. 6 is a principle graph showing the relationship between an operating angle of a wiper and a movable image pickup area when the TV camera unit is panned in the embodiment in FIG. 4.

From these angles, the controller 5 recognizes the pickup direction of the TV camera unit 6 and correspondingly converts the predetermined angle range $\beta_1 \sim \beta_2$ of the detected dynamic image A shown by oblique lines in FIG. 5 into an angle $\gamma_1$ commencing the interference with the wiper 2 and an angle $\gamma_2$, terminating the interference of the pickup area A as shown in FIG. 6, as follows at Step S13:

At first, assuming that a distance from the panning axis 60a of the pan head 60 to the cleaning face of the wiper is $\delta$, the size of he pickup area A is $L_1$ long by $L_2$ wide, and a distance between the rotating axis of the wiper 2 and the origin 0 of the pickup area A is H, the angles $\gamma_1$, $\gamma_2$ are given by the following equation:

$$\gamma_1 = \tan^{-1} \frac{(L_2/2) + \delta \tan \theta}{H - (L_1/2) + \delta \tan \alpha}$$

$$\gamma_2 = \tan^{-1} \frac{(L_2/2) - \delta \tan \theta}{H - (L_1/2) + \delta \tan \alpha}$$

Therefore, according to the up/down angle $\alpha$ and the right/left angle $\theta$ of the pan angle, pickup angles $k_1$, $k_2$ are corrected from the reference angle range $\beta_1 \sim \beta_2$ (see FIG. 2) as follows:

$$k_1 = 90° - \gamma_1$$

$$k_2 = 90° + \gamma_2$$

Namely, in the angle range $k_1 \sim k_2$, the wiper image gets into the pickup area.

It is to be noted that the size $L_1$, $L_2$ of the pickup area A can be predetermined by the aforementioned distance $\delta$ and the pickup angle of the TV camera unit 6.

The controller 5 which has thus calculated the corrected angle range $k_1 \sim k_2$ determines whether or not the drive angle $\beta$ from the angle sensor 4 resides within the corrected angle range $k_1 \sim k_2$ of the TV camera unit 6, as shown at Step S14.

As a result of this determination, if the drive angle $\beta$ of the wiper 2 resides in the angle range ($\beta \leq k_1$ or $k_2 \leq \beta$) shown by oblique lines in FIG. 6, which means that the detected dynamic image A is not disturbed by the wiper 2, the controller 5 makes the change-over switch 8 change over tot he side of the TV camera unit 6 to provide as an output the detected image data without changes, as shown at Step S15.

On the other hand, if the driven angle $\beta$ of the wiper 2 resides in the angle range ($k_1 < \beta < k_2$) within the oblique line portion in FIG. 6, the detected image A is disturbed by the wiper 2 so that it can not be used as it is.

Therefore, the controller 5 makes the change-over switch 8 change over to the side of the image storage 7, as shown at Step S16.

Then, the controller 5 makes the update image data which is always updated and stored at the image memory 71 of the image storage 7 transfer to the output image memory 72, as shown at Step S17, and makes the data of the static image A' of the output image memory 72 provide as an output through the change-over switch 8, as shown at Step S18.

Thus, when the wiper 2 resides outside the predetermined image pickup angle range $k_1 \sim k_2$ corrected according to the pan angle of the TV camera unit 6, the detected dynamic image A is directly provided as a dynamic image data output without changes, However, when the wiper 2 resides within the pickup angle range $k_1 \sim k_2$, the update static image A' which has been stored while updated at the image memory 71 is sequentially transferred as static image data to the output image memory 72 for a time interval the wiper 2 takes to pass through the pickup angle $k_1 \sim k_2$. Then, the data of the output image memory 72 are read out therefrom and provided as outputs through the change-over switch 8.

Figure 8:
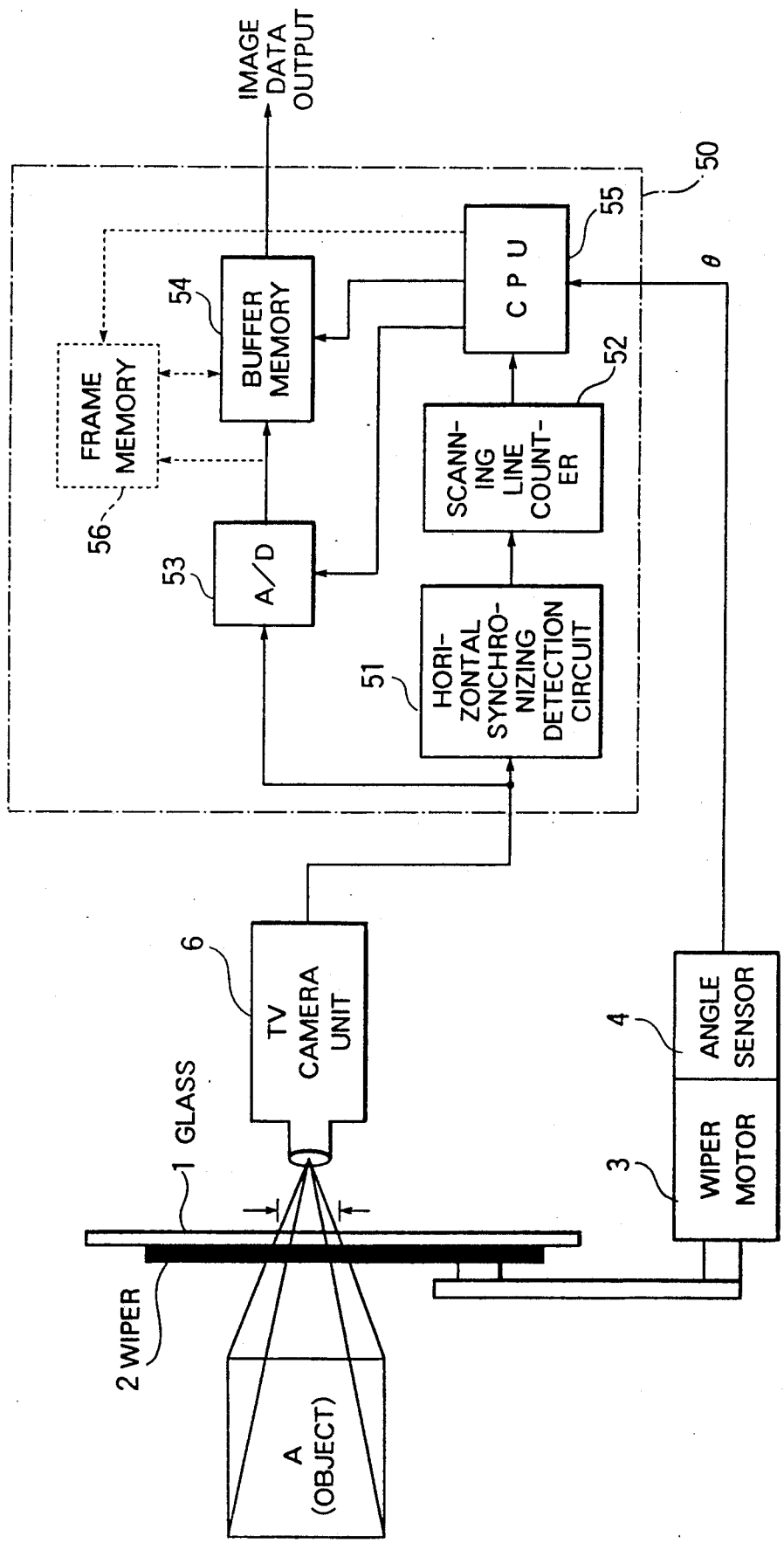
FIG. 8 is a block diagram showing a system arrangement of a further embodiment of an image detection system for a car according to the present invention.

FIG. 8 is a block diagram illustrating the arrangement of a further embodiment of an image detection system according to the present invention for the purpose of substituting predetermined data for the image of the wiper during moving.

For this purpose, an image processing circuit 50 is connected to the TV camera unit 6 and the angle sensor 4 and serves as image processing means which determines the range of scanning lines to be masked with an angle signal from the angle sensor 4 and masks the portion of scanning line in the masked range with respect to an image signal obtained form the TV camera unit 6.

The image processing circuit 50 is formed of a horizontal synchronizing detection circuit 51 for detecting a horizontal synchronizing signal in the image signal from the TV camera unit 6, a scanning line counter 52 for counting the scanning line number of the detected image signal based on the horizontal synchronizing signal detected at the horizontal synchronizing detection circuit 51, an A/D converter 53 for converting pixel signals into the corresponding digital signals between adjacent scanning lines, a buffer memory 54 for storing the output data from the A/D converter 53, and CPU 55 responsive to the scanning line number from the counter 52 and the wiper angle $\theta$ from the angle sensor 4 to control the A/D converter 53 and the buffer memory 54. It is to be noted that other elements correspond with the elements shown by the same reference numerals in FIGS. 1 and 4.

Next, the operation of the above embodiment in FIG. 8 will be described with reference to FIGS. 9-11.

The TV camera unit 6 detects an image A of an object (see FIG. 8) in front of the wiper 2 and continuously delivers the image signal to the image processing circuit 50, as shown at Step S21 in the flow chart of the image processing circuit 50 in FIG. 11.

On the other hand, the wiper 2 is being electrically driven by the wiper motor 3, and a signal indicating a drive angle $\theta$ of the wiper motor 3 is detected by the angle sensor 4 interlocked with the wiper motor 3 and is then provided for the image processing circuit 50, as shown at Step S22.

Figure 9:
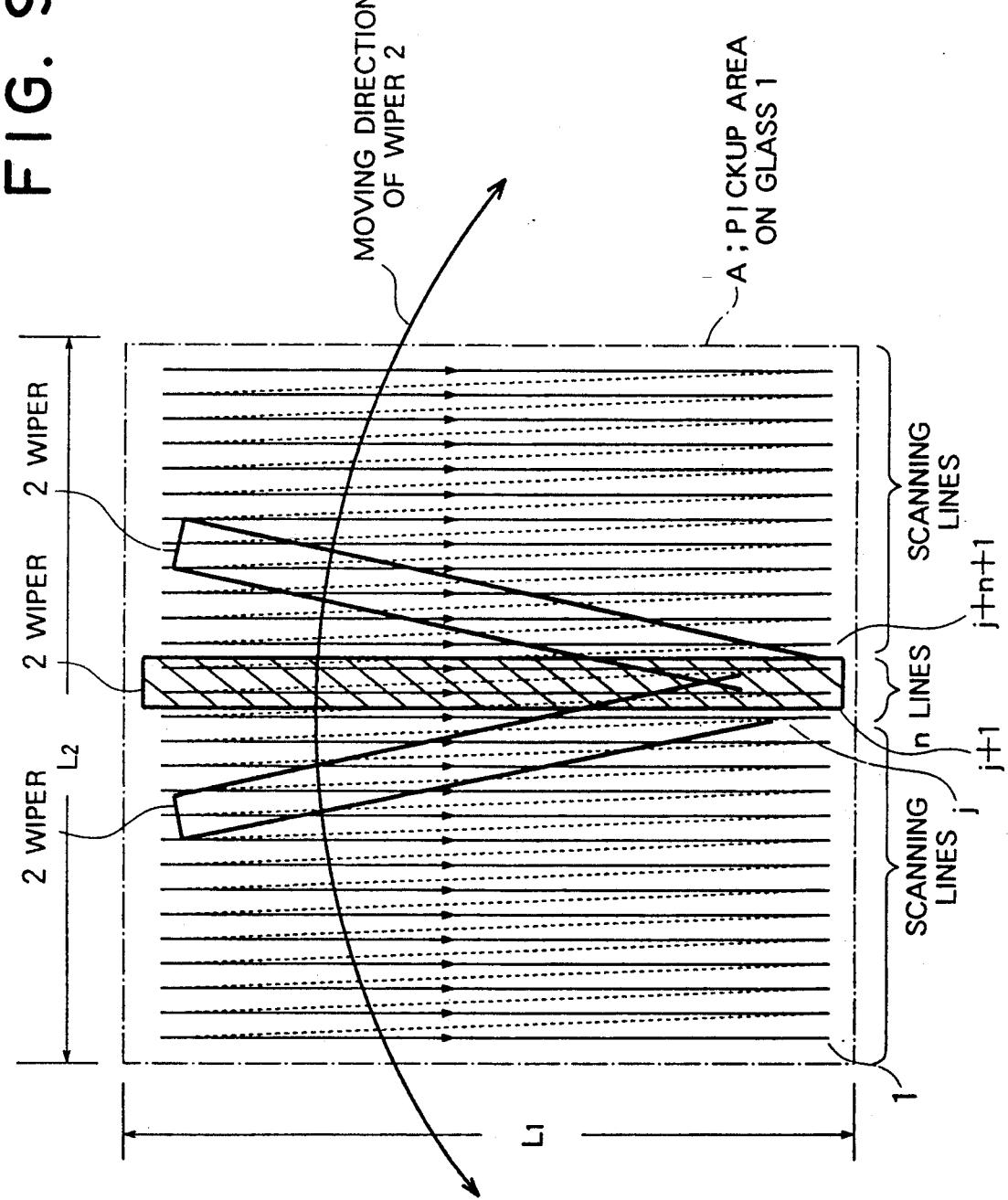
FIG. 9 is a graph for the illustration of the relationship between the image of a wiper and scanning lines of a TV camera unit in the embodiment in FIG. 8.

It is to be noted that the position of the camera is preset such that the direction of scanning lines of the TV camera unit 6 is perpendicular to the direction of the moving (cleaning) of the wiper 2, as shown by oblique lines in FIG. 9.

Then, the image of the wiper 2 during the cleaning operation is detected by the TV camera unit 6. If the wiper image is positioned at such a position as shown by oblique lines in FIG. 9 and it is assumed that the number of invalid scanning lines which the image of the wiper crosses and forms an image signal is n, the CPU 65 of the image processing circuit 50 calculates scanning line numbers j+1 and j+n in the scanning line range on the basis of the drive angle $\theta$ of the wiper 2 detected by the angle sensor 4, as shown at Step S23. It is to be noted that the drive angle at the time when the wiper 2 passes through the image pickup area A shown by a dot-dash line in FIG. 9 is predetermined from the mutual positional relationship of the wiper 2 and the TV camera unit 6 so that the position in the image taken by the TV camera unit 6 where the image of the wiper 2 intrudes, is found from the driven angle $\theta$ from the angle sensor 4.

Hereinafter, the method of calculating the above-noted scanning line number j+1 and j+n form the drive angle of the wiper 2 will be described with reference to FIG. 10.

Figure 10:
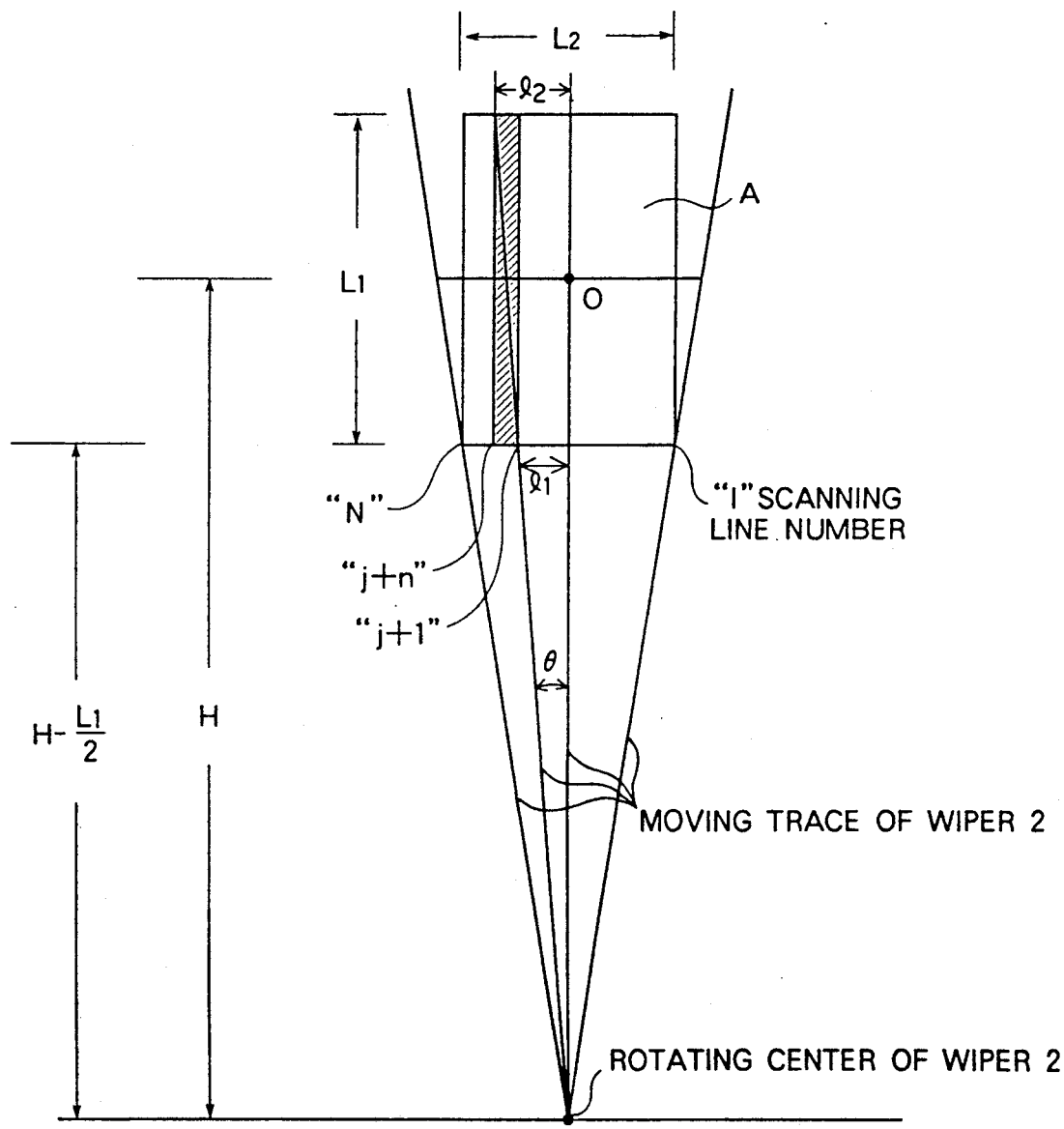
FIG. 10 is a principle graph for the illustration of a method for determining a scanning line range to be masked in the embodiment in FIG. 8; and, FIG. 11 is a flow chart showing the masking algorithm of the embodiment in FIG. 8.

In FIG. 10, assuming that the size of the pickup area is $L_1$ long and $L_2$ wide and the distance between the rotational center of the wiper 2 and the origin O of the pickup area A is H, and the horizontal distances $l_1$, $l_2$ from the origin O in the range of the scanning lines j+1~j+n (shown by oblique lines which are thought to be crossing the wiper 2, are given by the respective equations:

$$l_1 = \{H - (L_1/2)\}\tan\theta$$

$$l_2 = \{H + (L_1/2)\}\tan\theta$$

Namely, if the wide distance $L_2$ of the pickup area is formed by scanning lines, the position of the scanning lines of the image of the wiper 2 resides between the distances $l_1$ and $l_2$.

Accordingly, the scanning line members j+1 and j+n corresponding to the distance range $l_1 \sim l_2$ are given by the following equations because $L_2$ corresponds to N, $l_1$ corresponds to j+1, and $l_2$ corresponds to j+n, respectively:

$$j+1 = N\{(\tfrac{1}{2}) - (l_1/L_2)\}$$

$$j+n = N\{(\tfrac{1}{2}) - (il_2/L_2)\}$$

It is to be noted that in practice a margin may be given tot he above j+1 and j+n, taking into account that the wiper 2 has an arm or blade which can be unintentionally moved due to its transformation.

Then, the following masking operation will be carried out with respect to the $j+1_{st}$ scanning line $\sim j+n_{th}$ scanning line to be masked as noted-above among all of the scanning lines forming the image signal provided as an output form the TV camera unit 6:

First of all, the horizontal synchronizing detection circuit 51 of the image processing circuit 50 detects a horizontal synchronizing signal from the detected image signal of the TV camera unit 6, as shown at Step S24.

Then, the scanning line counter 62 counts the scanning lines from the number of 1 to the maximum N included in the horizontal synchronizing signal as detected and the count is provided for the CPU 65, which carries out the following processing in the respective cases of the count a being such that $j+1 \leq a \leq j+n$, $a < j+1$, or $j+n < a$, as shown at Step S25.

At first, in the case where the count a is such that $j+1 \leq a \leq j+n$, a row of blank data corresponding to the pixels of the scanning line is stored at the buffer memory 64, as shown at Step S26. It is to be noted that the blank data may be "1" if "0" data are detected for actual wiper images. Other various blank data may also be used if predetermined.

In the case where the count a is such that $a < j+1$ or $j+n < a$, the CPU 65 makes the A/D converter 63 convert the pixel signals into the corresponding digital data in the scanning lines, as shown at Step S27 and stores the data row into the buffer memory 64 in correspondence with the scanning lines, as shown at Step S28.

The CPU 65 sequentially reads the data row for each scanning line out of the buffer memory 64, as shown at Step S29, and provides as image data output for one screen after the masking operation, while the wiper portion gives no rise to processing error because of the blank data disregarded for the following data processing.

It is to be noted that the scanning lines forming the image shown in FIG. 9 are formed of 525 scanning lines (=N scanning lines) according to the NTSC system. In this case, the range of the scanning lines $1 \sim j+1$ and $j+n \sim 525$ is provided as valid image region where no image of the wiper 2 is included.

Next, the method of the present invention wherein instead of the scanning line portion as masked in the above masking operation, being given blank data, this portion is substituted by data before masking will be described. It is to be noted that the flow of the processing of this alternative is shown by dotted lines.

The CPU 65 caused each pixel data row for each of the scanning lines after the A/D conversion which have been stored as data in the buffer memory 64, to be stored in the frame memory 66 for one frame of the screen in the case where the count a is such that $a < j+1$ or $j+n < a$, as shown at Step S30. Namely, the pixel data for each of the scanning lines stored in the frame memory 66, is updated non-masked data.

Therefore, the CPU 65 reads the pixel data row of the scanning lines corresponding to the count of the scanning line counter 62 out of the frame memory 66 in the case where the count a is such that $j+1 \leq a \leq j+n$, as shown at Step S31.

Then, the pixel data row as read out is again stored in the buffer memory 64, as shown at Step S32.

Thereafter, the data of the buffer memory 64 are provided as outputs as aforementioned, as shown at Step S29, thereby transplanting the data just before masking into the scanning line portion to be masked.

Thus, the image of the wiper 2 intruding into the detected image is masked and blank-displayed, or substituted by image data from just before the masking operation, whereby a portion displaying no wiper, i.e. non-masked portion is provided as output data out of the buffer memory 64 because it is valid.

While a number of alternatives and modifications have been discussed above, it will be appreciated that the invention encompasses all forms and variations within the scope of the appended claims.

What is claimed is:

1. An image detection system for a car comprising:
    means for driving a wiper;
    means for detecting a drive angle of said driving means;
    means for detecting an image in front of said wiper from the inside of the car and providing it as data output;
    means for storing-updating the image data output from said image detecting means;
    means for changing the output of said image detecting means over to the output of said storing-updating means;
    means for controlling said change-over means to the side of said image storing-updating means only when said drive angle resides in a predetermined image pickup angle range of said image detecting means and for providing, as an output, static image data from said storing-updating means.

2. An image detection system for a car as claimed in claim 1, wherein said storing-updating means includes an image memory continuously updated by the data output of said imaged detecting means and an output image memory connected to one side of said change-over means and storing and providing as outputs the update image data of said image memory when said change-over means is changed over to the side of said image storage.

3. An image detection system for a car as claimed in claim 1, wherein said controlling means controls said change-over means to the side of sad image detecting means when said drive angle resides outside the predetermined image pickup angle range and for providing, as an output, dynamic image data from said image detecting means.

4. An image detection system for a car comprising:
    means for driving a wiper;
    means for detecting a drive angle of said driving means;
    means for detecting an image in front of said wiper from the inside of the car and providing it as data output;
    means for panning said image detecting means up, down, right and left within a predetermined range and for providing, as an output, the pan angle;
    means for storing-updating the image data output from said image detecting means;
    means for changing the output of said image detection means over to the output of said storing-updating means; and
    means for controlling said change-over means tot he side of said image storing-updating means only when said drive angle resides in a predetermined image pickup angle range of said image detecting means which is corrected in response to said drive angle and for providing as an output status image data from said storing-updating means.

5. An image detection system for a car as claimed in claim 4, wherein said storing-updating means includes an image memory continuously updated by the data output of said image detecting means and an output image memory connected to one side of said change-over means and storing and providing as outputs the update image data of said image memory when said change-over means is changed over to the side of said image storage.

6. An image detection system for a car as claimed in claim 4, wherein said controlling means controls said change-over means to the side of said image detecting means when said drive angle resides outside the predetermined image pickup angle range and for providing, as an output, dynamic image data from said image detection means.

7. An image detection system for a car comprising:
    means for driving a wiper;
    means for detecting a drive angle of said driving means;
    means for detecting an image in front of said wiper, which is formed of scanning lines perpendicular to the moving direction of said wiper, from the inside of the car; and,
    image processing means for calculating, from said drive angle, a masking range said wiper crosses in all of the scanning lines of the image detected by said image detecting means and for masking only the image of the scanning lines in the masking range and providing, as outputs, blank data.

8. An image detection system for a car as claimed in claim 7, wherein said image processing means includes a buffer memory continuously updated by the output of said image detecting means for providing as outputs the updated data, and a frame memory continuously storing the update image data of said buffer memory and transferring the data therein corresponding to the masking range into said buffer memory only when said wiper crosses the masking range.

9. An image detection system for a car comprising:
means for driving a wiper;
means for detecting a drive angle of said driving means;
means for detecting an image in front of said wiper, which is formed of scanning lines perpendicular to the moving direction of said wiper, from the inside of the car; and,
image processing means for calculating, from said drive angle, a masking range said wiper crosses in all of the scanning lines of the image detected by said image detecting means and for masking only the image of the scanning lines in the masking range and providing, as outputs, static image data just before masking.

10. An image detection system for a car as claimed in claim 9, wherein said image processing means includes a buffer memory continuously updated by the output of said image detecting means for providing as outputs the updated data, and a frame memory continuously storing the update image data of said buffer memory and transferring the data therein corresponding to the masking range into said buffer memory only when said wiper crosses the masking range.

* * * * *

UNITED STATES PATENT AND TRADEMARK OFFICE
CERTIFICATE OF CORRECTION

PATENT NO.   : 5,177,606
DATED        : JANUARY 5, 1993
INVENTOR(S)  : TOSHIFUMI KOSHIZAWA

It is certified that error appears in the above-identified patent and that said Letters Patent is hereby corrected as shown below:

```
Col.  2,   line 57,   "form" should be --from--;
           line 58,   "lies" should --lines--.

Col.  5,   line 28,   "wit" should be --with--.

Col.  6,   line  9,   "he" should be --the--;
           line 44,   "tot he" should be --to the--.

Col.  8,   line  6,   "form" should be --from--;
           line  6,   "number" should be --numbers--;
           line 14,   "lines" should be --lines)--;
           line 33,   "(il₂/" should be -- (1₂/--;
           line 36,   "tot he"should be --to the--;
           line 43,   "form" should be --from--.

Col. 10,   line 32,   "tot he" should be --to the--;
           line 37,   "providing" should be --providing,--;
           line 37,   "output" should be --output,--.
```

Signed and Sealed this

Twenty-eighth Day of December, 1993

Attest:

BRUCE LEHMAN

*Attesting Officer*      *Commissioner of Patents and Trademarks*